United States Patent
Han et al.

(10) Patent No.: US 10,843,568 B2
(45) Date of Patent: Nov. 24, 2020

(54) ELECTRIC VEHICLE

(71) Applicant: HANWHA DEFENSE CO., LTD., Changwon-si (KR)

(72) Inventors: Seong Hun Han, Changwon-si (KR); Hee Seo Chae, Changwon-si (KR); Sung Eun Park, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 643 days.

(21) Appl. No.: 15/548,879

(22) PCT Filed: Feb. 25, 2015

(86) PCT No.: PCT/KR2015/001785
§ 371 (c)(1),
(2) Date: Aug. 4, 2017

(87) PCT Pub. No.: WO2016/125945
PCT Pub. Date: Aug. 11, 2016

(65) Prior Publication Data
US 2018/0009318 A1    Jan. 11, 2018

(30) Foreign Application Priority Data
Feb. 4, 2015  (KR) .................. 10-2015-0017476

(51) Int. Cl.
*B60L 3/00* (2019.01)
*H02J 7/00* (2006.01)
(Continued)

(52) U.S. Cl.
CPC ............. *B60L 3/0046* (2013.01); *B60L 15/20* (2013.01); *B60L 50/40* (2019.02); *H02J 7/00* (2013.01);
(Continued)

(58) Field of Classification Search
CPC .. B60L 15/20; B60L 15/2009; B60L 15/2018; B60L 15/2027; B60L 15/2036;
(Continued)

(56) References Cited

U.S. PATENT DOCUMENTS

2004/0026140 A1* 2/2004 Suzuki .................. B60K 6/485
                                                                180/65.26
2008/0310198 A1* 12/2008 Chiang .................. H02M 1/36
                                                                363/50
(Continued)

FOREIGN PATENT DOCUMENTS

JP    2003-102101 A    4/2003
JP    2005-160154 A    6/2005
(Continued)

OTHER PUBLICATIONS

Search Report and Written Opinion dated Sep. 24, 2015 issued by the International Searching Authority in counterpart International Application PCT/KR2015/001785 (PCT/ISA/220/210/237).

*Primary Examiner* — David V Henze-Gongola
*Assistant Examiner* — Tarikh Kanem Rankine
(74) *Attorney, Agent, or Firm* — Sughrue Mion, PLLC

(57) ABSTRACT

In an electric vehicle, a power supplier includes a software type condenser charging circuit and a hardware type condenser charging circuit. The software capacitor charging circuit operates when a controller controls the software type condenser charging circuit while monitoring a voltage between opposite ends at an initial charging stage. The hardware type condenser charging circuit is operated when the controller controls the hardware type condenser charging circuit without monitoring the voltage between the opposite ends of the DC-link condenser or by direct switching manipulation of a user.

10 Claims, 9 Drawing Sheets

(51) Int. Cl.
  *H02J 7/34* (2006.01)
  *B60L 50/40* (2019.01)
  *B60L 15/20* (2006.01)
  *B60L 15/22* (2006.01)

(52) U.S. Cl.
  CPC ........... *H02J 7/345* (2013.01); *B60L 15/2009* (2013.01); *B60L 15/2018* (2013.01); *B60L 15/22* (2013.01); *B60L 2240/547* (2013.01); *B60L 2250/12* (2013.01); *B60L 2250/24* (2013.01); *H02J 7/0031* (2013.01); *Y02T 10/70* (2013.01); *Y02T 10/72* (2013.01)

(58) Field of Classification Search
  CPC ............. B60L 15/2045; B60L 15/2054; B60L 15/2063; B60L 15/2081; B60L 15/209; B60L 15/22; B60L 15/30; B60L 15/32; B60L 15/34; B60L 15/36; B60L 15/38; B60L 15/40; B60L 53/00; B60L 50/40; H02J 7/00; H02J 7/0031; H02J 7/007
  USPC .......................................................... 320/109
  See application file for complete search history.

(56) References Cited

U.S. PATENT DOCUMENTS

| | | | |
|---|---|---|---|
| 2009/0128158 A1 | 5/2009 | Kawai | |
| 2009/0212627 A1* | 8/2009 | Sakata | H02H 9/001 307/10.7 |
| 2011/0055037 A1* | 3/2011 | Hayashigawa | B60L 53/11 705/26.1 |
| 2012/0040224 A1* | 2/2012 | Reischmann | H01M 10/425 429/120 |
| 2012/0150372 A1 | 6/2012 | Chiang et al. | |
| 2012/0212176 A1 | 8/2012 | Park | |
| 2013/0090797 A1* | 4/2013 | Izumi | B60L 58/12 701/22 |
| 2013/0124029 A1* | 5/2013 | Izumi | B60K 6/445 701/22 |
| 2013/0234508 A1 | 9/2013 | Eisele et al. | |
| 2014/0021916 A1* | 1/2014 | Bilezikjian | B60L 53/14 320/109 |
| 2014/0062403 A1* | 3/2014 | Ohkuma | B60L 53/305 320/109 |
| 2014/0175806 A1 | 6/2014 | Kim | |
| 2014/0306666 A1* | 10/2014 | Choi | H02J 7/0016 320/134 |
| 2014/0347003 A1* | 11/2014 | Sporck | H02J 7/045 320/107 |
| 2015/0084404 A1* | 3/2015 | Hashim | B60L 50/50 307/9.1 |
| 2015/0123612 A1* | 5/2015 | Ide | H02M 1/10 320/109 |
| 2015/0183419 A1* | 7/2015 | Chae | B62D 11/003 701/22 |
| 2015/0197153 A1* | 7/2015 | Luedtke | B60L 3/0023 324/503 |
| 2015/0231976 A1* | 8/2015 | Byun | B60L 53/11 320/109 |
| 2018/0009318 A1* | 1/2018 | Han | B60L 15/20 |

FOREIGN PATENT DOCUMENTS

| | | |
|---|---|---|
| JP | 2007-71871 A | 3/2007 |
| JP | 2009-201266 A | 9/2009 |
| JP | 2014-506105 A | 3/2014 |
| KR | 10-2005-0015387 A | 2/2005 |
| KR | 10-2005-0045597 A | 5/2005 |
| KR | 10-2012-0095608 A | 8/2012 |
| KR | 10-2014-0020631 A | 2/2014 |
| KR | 10-2014-0055011 A | 5/2014 |
| KR | 10-1416406 B1 | 8/2014 |
| WO | 99/29007 A1 | 6/1999 |

\* cited by examiner

ELECTRIC VEHICLE

TECHNICAL FIELD

The present invention relates to an electric vehicle, and more particularly, to an electric vehicle driven by at least one vehicle driving motor.

BACKGROUND ART

In general, electric vehicles including hybrid electric vehicles (hereinafter, referred to as electric vehicles) are driven by at least one vehicle driving motor.

For example, when six in-wheel motors are used, six vehicle driving motors and six motor drivers are necessary. In addition, when one traction motor is used, one vehicle driving motor and one motor driver are necessary.

In the above electric vehicles, electrical loads including the motor driver receive electric power via a direct current (DC)-link condenser. That is, when an electric switch of an electric vehicle is turned on by manipulation of a user, the DC-link condenser is charged by a battery that is a DC power source and then the electric power is supplied to each of components.

Right after the turning-on of the electric switch in the electric vehicle by the manipulation of the user, an overcurrent may flow from the battery, that is, the DC power source, to the DC-link condenser. In this case, the DC-link condenser and the loads may electrically break.

In order to address the above problem, in an electric vehicle according to the related art, a software type capacitor charging circuit is connected between the DC power source and the DC-link condenser. That is, a controller of the electric vehicle controls operations of the capacitor charging circuit while monitoring a voltage between opposite ends of the DC-link condenser at an initial stage of the charging.

For example, the software type condenser charging circuit includes an initial switching circuit and a main relay. The initial switching circuit provides a current path through which a relatively small amount of current flows at an initial stage of the charging. The main relay is connected between the DC power source and the DC-link condenser. Here, the controller of the electric vehicle according to the related art charges the DC-link condenser through the initial switching circuit during a set time period at the initial stage of the charging, and after that, when the voltage between the opposite ends of the DC-link condenser is greater than a set voltage, the controller turns the main relay on.

According to the electric vehicle of the related art, the initial charging is controlled by the controller as the software type, following problems occur.

First, when there is an error in the software or in operations of the controller during the initial charging stage, the DC-link condenser may not be charged. That is, the electric vehicle may not move.

Second, if there is an error in the software or in operations of the control during the initial charging stage, the DC-link condenser and loads may electrically break.

In particular, if the above problems occur in the electric vehicle in a state of manned driving, not unmanned driving, passengers in the electric vehicle may be severely damaged. For example, if a soldier is in a battle while driving a military use electric vehicle, the soldier may be endangered.

Third, since the controller indirectly controls the DC-link condenser while monitoring the voltage between the opposite ends of the DC-link condenser at the initial stage of charging, accuracy of initial charging control is not excellent.

The information in the background art described above was obtained by the inventors for the purpose of developing the present disclosure or was obtained during the process of developing the present disclosure. As such, it is to be appreciated that this information did not necessarily belong to the public domain before the patent filing date of the present disclosure.

DETAILED DESCRIPTION OF THE INVENTIVE CONCEPT

Technical Problem

One or more embodiments of the present disclosure relate to an electric vehicle capable of addressing problems in an initial charging operation via software according to the related art.

Technical Solution

According to an embodiment of the present invention, there is provided an electric vehicle driven by at least one vehicle driving motor, the electric vehicle including: a controller and an electric power supplier, wherein the electric power supplier includes: a direct-current (DC) power source; a DC-link condenser; a software type condenser charging circuit; and a hardware type condenser charging circuit.

Electrical loads are connected to the DC-link condenser.

The software type condenser charging circuit is connected between the DC power source and the DC-link condenser, and is configured to operate when the controller controls the software type condenser charging circuit while monitoring a voltage between opposite ends of the DC-link condenser at an initial charging stage.

The hardware type condenser charging circuit is connected between the DC power source and the DC-link condenser, and is configured to operate when the controller controls the hardware type condenser charging circuit without monitoring the voltage between the opposite ends of the DC-link condenser at the initial charging stage, or by a direct switching manipulation of a user.

Advantageous Effects

According to an electric vehicle of the present disclosure, a software type condenser charging circuit and a hardware type condenser charging circuit may be adaptively used. Accordingly, following effects may be obtained.

First, when there is an error in the software at the initial charging, the hardware type condenser charging circuit may be operated by a controller. Also, when there is an error in operations of the controller, the hardware type condenser charging circuit may be operated by direct switching manipulation of the user.

Therefore, even if an error occurs in the operations of the initial charging software and operations of the controller, a DC-link condenser may be normally charged by the hardware type condenser charging circuit. Therefore, problems of not operating the electric vehicle or electric damages in the DC-link condenser and the loads may be prevented.

In particular, if the above problems do not occur in an electric vehicle in a state of manned driving, not unmanned driving, passengers in the electric vehicle may not hurt. For example, if a soldier is in a battle while driving a military use electric vehicle, the soldier may not be endangered.

Second, the hardware type condenser charging circuit is operated when the controller controls the hardware type condenser charging circuit without monitoring the voltage between the opposite ends of the DC-link condenser or by the direct switching manipulation of the user. Therefore, when the hardware type condenser charging circuit is used, the accuracy of initial charging control may be relatively improved.

Third, when the hardware type condenser charging circuit is partially broken, a part of the software type condenser charging circuit may be operated instead. In this case, the accuracy in the initial charging control may be improved when comparing with a case in which the software type condenser charging circuit is only used. Also, when the software type condenser charging circuit is partially broken, a part of the hardware type condenser charging circuit may be operated instead.

In addition, the software type condenser charging circuit and the hardware type condenser charging circuit may be appropriately and efficiently used. For example, when the electric vehicle operates in a manned driving mode, a high accuracy of initial charging operation is necessary, and thus, the hardware type condenser charging circuit is appropriate. In addition, when the electric vehicle operates in an unmanned driving mode, the controller performs remote controlling, and thus, the software type condenser charging circuit is appropriate.

BEST MODE

The following description and the attached drawings are provided for better understanding of the disclosure, and descriptions of techniques or structures related to the present disclosure which would be obvious to one of ordinary skill in the art will be omitted.

The specification and drawings should be considered in a descriptive sense only and not for purposes of limitation. Therefore, the scope of the present disclosure is defined by the appended claims. The terms and words which are used in the present specification and the appended claims should not be construed as being confined to common meanings or dictionary meanings but should be construed as meanings and concepts matching the technical spirit of the present disclosure in order to describe the present disclosure in the best fashion.

Hereinafter, one or more embodiments of the present disclosure will be described in detail with reference to accompanying drawings.

Figure 1:
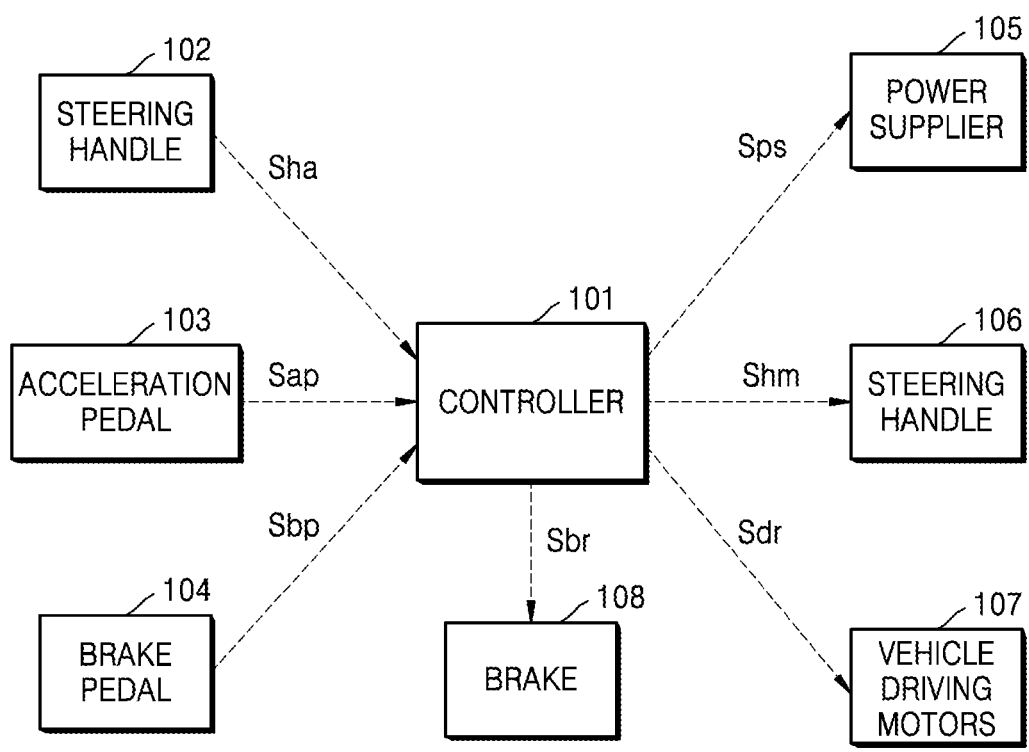
FIG. 1 is a block diagram of an electric vehicle according to an embodiment of the present disclosure.

FIG. 1 is a block diagram of an electric vehicle according to an embodiment of the present disclosure. The electric vehicle according to an embodiment of the present disclosure moves when wheels are rotated by vehicle driving motors 107, e.g., six in-wheel motors. In a case where a traction motor, not the in-wheel motors, is used, one vehicle driving motor may be used.

Referring to FIG. 1, a power supplier 105 operating according to control signals Sps from a controller 101 supplies electric power to each of components. The power supplier 105 will be described in detail with reference to FIGS. 2 to 9.

The controller 101 processes a signal Sha input from a steering handle 102, a signal Sap input from an acceleration pedal 103, and a signal Sbp input from a brake pedal 104. According to a result of processing input signals, the controller 101 outputs control signals Shm of a steering motor 106, control signals Sdr of vehicle driving motors 207, and control signals Sbr of a brake 108.

Figure 2:
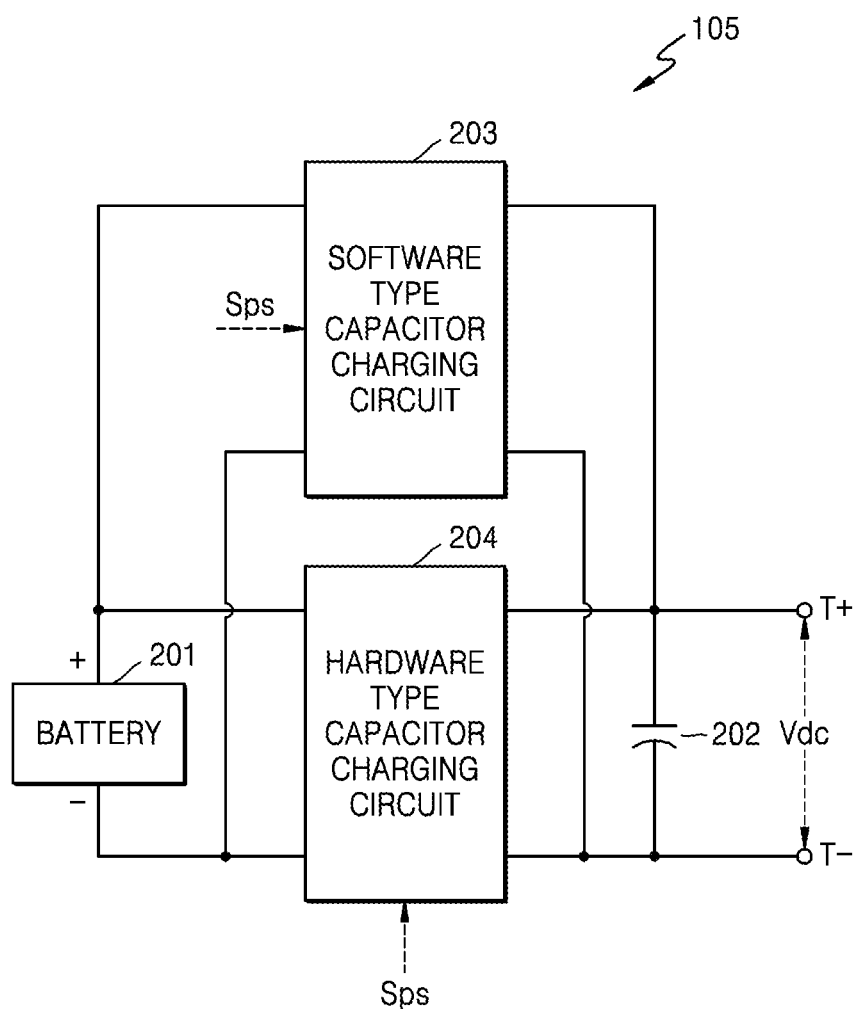
FIG. 2 is a diagram of an internal structure of a power supplier in FIG. 1.

FIG. 2 is a diagram of an internal structure of the power supplier 105 in FIG. 1. Here, a configuration of charging a battery 201 as a direct current (DC) power source by using a power generator is not relevant with the present disclosure, and descriptions thereof are omitted.

Referring to FIG. 2, the power supplier 105 includes the battery 201 as a DC power source, a DC-link condenser 202, a software type condenser charging circuit 203, and a hardware type condenser charging circuit 204. In FIG. 2, a reference numeral Sps denotes control signals from the controller 101 (see FIG. 1), T+ denotes a positive terminal of the DC-link condenser 202, and T− denotes a negative terminal of the DC-link condenser 202.

Electrical loads are connected to the DC-link condenser 202.

The software type condenser charging circuit 203 is connected between the battery 201 as the DC power source and the DC-link condenser 202, and operates when the controller 101 (see FIG. 1) controls the software type condenser charging circuit 203 while monitoring a voltage Vdc between opposite ends of the DC-link condenser 202 at the initial charging stage.

The hardware type condenser charging circuit 204 is connected between the battery 201 as the DC power source and the DC-link condenser 202, and operates when the controller 101 (see FIG. 1) controls the hardware type condenser charging circuit 204 without monitoring the voltage Vdc between the opposite ends of the DC-link condenser 202 at the initial charging stage or operates by direct switching manipulation of the user.

The software type condenser charging circuit 203 and the hardware type condenser charging circuit 204 are selectively operated by the user. Also, if the hardware type condenser charging circuit 204 is partially broken, a part of the software type condenser charging circuit 203 operates instead.

According to the electric vehicle according to the present embodiment, the software type condenser charging circuit 203 and the hardware type condenser charging circuit 204 may be adaptively used. Accordingly, following effects may be obtained.

First, when there is an error in the software at the initial charging, the hardware type condenser charging circuit 204 may be operated by the controller 101. Also, when there is an error in operations of the controller 101, the hardware type condenser charging circuit 204 may be operated by direct switching manipulation of the user.

Therefore, even if an error occurs in the operations of the software or the controller 101 at the initial charging stage, the DC-link condenser 202 may be normally charged by the hardware type condenser charging circuit 204. Therefore, problems of not operating the electric vehicle or electric damages in the DC-link condenser 202 and the loads may be prevented.

In particular, if the above problems do not occur in an electric vehicle in a state of manned driving, not unmanned driving, passengers in the electric vehicle may not hurt. For example, if a soldier is in a battle while driving a military use electric vehicle, the soldier may not be endangered.

In addition, the hardware type condenser charging circuit 204 may operate when the controller 101 controls the hardware type condenser charging circuit 204 without monitoring the voltage Vdc between the opposite ends or by direct switching manipulation of the user. Therefore, when the hardware type condenser charging circuit 204 is used, the accuracy of initial charging control may be relatively improved.

Also, if the hardware type condenser charging circuit 204 is partially broken, a part of the software type condenser charging circuit 203 operates instead. In this case, the accuracy in the initial charging control may be improved when comparing with a case in which the software type condenser charging circuit 203 is only used. Also, if the software type condenser charging circuit 203 is partially broken, a part of the hardware type condenser charging circuit 204 may operate instead.

In addition, the software type condenser charging circuit 203 and the hardware type condenser charging circuit 204 may be appropriately and efficiently used. For example, when the electric vehicle operates in a manned driving mode, a high accuracy of initial charging operation is necessary, and thus, the hardware type condenser charging circuit 204 is appropriate. In addition, when the electric vehicle operates in an unmanned driving mode, the controller 101 performs remote controlling, and thus, the software type condenser charging circuit 203 is appropriate.

Hereinafter, examples of the structure and operations in FIG. 2 will be described in detail.

Figure 3:
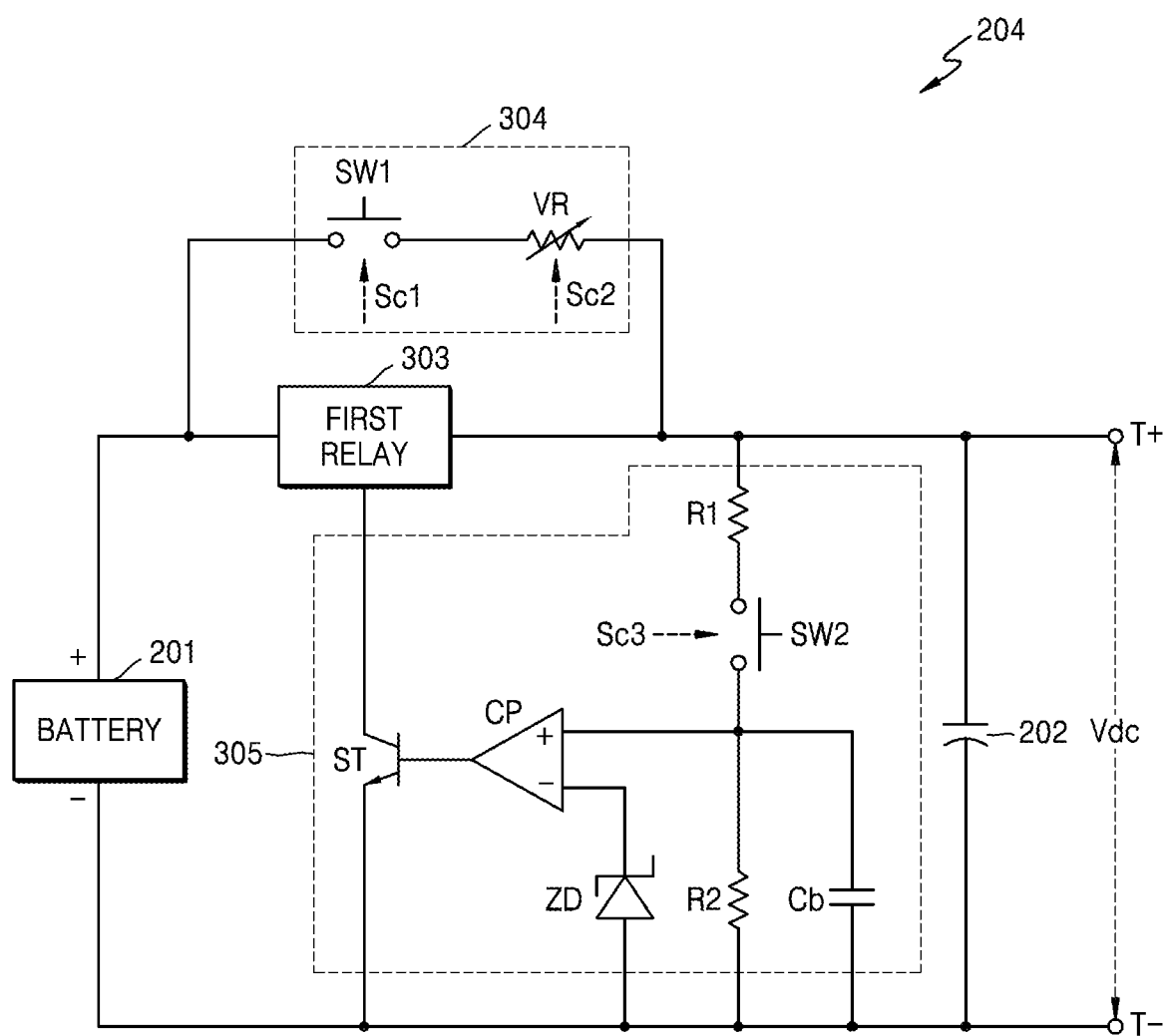
FIG. 3 is a diagram showing an example of a hardware type charging circuit of FIG. 2.

FIG. 3 shows an example of the hardware type condenser charging circuit 204 of FIG. 2. In FIG. 3, like reference numerals to those of FIG. 2 denote the same elements. In FIG. 3, a first control signal Sc1, a second control signal Sc2, and a third control signal Sc3 are included in control signals Sps from the controller 101 (see FIG. 1).

Referring to FIG. 3, the hardware type condenser charging circuit 204 of FIG. 2 includes a first relay 303, an initial switching circuit 304, and a relay driving circuit 305.

The first relay 303 is connected between a positive terminal of the battery 201 and a positive terminal (T+) of the DC-link condenser 202.

The initial switching circuit 304 is connected to opposite ends of the first relay 303 to provide a current path at an initial charging stage.

When the voltage Vdc of the DC-link condenser 202 is increased higher than a set initial voltage by the initial switching circuit 304, the relay driving circuit 305 turns the first relay 303 on. In the present embodiment, the set initial voltage is set as 60% of a maximum charging voltage. As described above, the relay driving circuit 305 drives the first relay 303 as hardware type, the accuracy of the initial charging control of the hardware type condenser charging circuit 204 is greater than that of the software type condenser charging circuit 203.

The initial switching circuit 304 includes a first switch SW1 and a variable resistor VR connected in series to each other. The first switch SW1 is turned on (On) or turned off (Off) according to the first control signal Sc1 from the controller 101 (see FIG. 1) or by user manipulation. The variable resistor VR has a resistance value varying depending on a second control signal Sc from the controller 101 or user manipulation.

The relay driving circuit 305 includes a switching transistor ST, a comparator CP, and voltage detection circuits R1, SW2, and R2.

The voltage detection circuits R1, SW2, and R2 are connected to opposite ends of the DC-link condenser 202. When the switching transistor ST is turned on, an exciting current path of the first relay is formed. When the switching transistor ST is turned off, the exciting current path of the first relay 303 is blocked.

A voltage detected by the voltage detection circuits R1, SW2, and R2 becomes higher than a set detection voltage, the comparator CP is turned on, and accordingly, the switching transistor ST is turned on.

The voltage detection circuits R1, SW2, and R2 include a first resistor R1, a second switch SW2, and a second resistor R2 connected to one another in series. An end of the first resistor R1 is connected to an end of the DC-link condenser 202. An end of the second resistor R2 is connected to a ground terminal, that is, a negative terminal. The second switch SW2 is connected between the other end of the first resistor R1 and the other end of the second resistor R2.

The second switch SW2 is turned on (On) or turned off (Off) according to a third control signal Sc3 from the controller 101 (see FIG. 1) or by user manipulation.

The other end of the second resistor R2 is connected to a positive input terminal of the comparator CP. Therefore, the detection voltage denotes a voltage between opposite ends of the second resistor R2.

A Zener diode ZD maintaining a reference voltage is connected between a negative (−) input terminal of the comparator CP and the ground terminal. A pulse bypass capacitor Cb is connected between the other end of the second resistor R2 and the ground terminal.

Therefore, when the first switch SW1 and the second switch SW2 are in turned-on state according to the control signals Sc1 and Sc3 or by direct user manipulation at the initial charging stage, a relatively small amount of current flows through the initial switching circuit 304 to charge the DC-link condenser 202. Here, when the voltage between the opposite ends of the second resistor R2 is higher than the set detection voltage, the comparator CP, the switching transistor ST, and the first relay 303 are turned on (On). That is, a relatively large amount of current flows through the first relay 303 and the initial switching circuit 304 to charge the DC-link condenser 202. Here, the first switch SW1 is turned off (Off), and the initial switching circuit 304 may be blocked.

As described above, the first switch SW1 is turned on or turned off according to the first control signal Sc1 from the controller 101 (see FIG. 1) or by the user manipulation. The variable resistor VR has a resistance value varying depending on a second control signal Sc from the controller 101 or user manipulation. In addition, the second switch SW2 is turned on (On) or turned off (Off) according to a third control signal Sc3 from the controller 101 or by user manipulation. Therefore, the hardware type condenser charging circuit 204 may operate when the controller 101 controls the hardware type condenser charging circuit 204 without monitoring the voltage Vdc between the opposite ends at the initial charging stage or by direct switching manipulation of the user.

Figure 4:
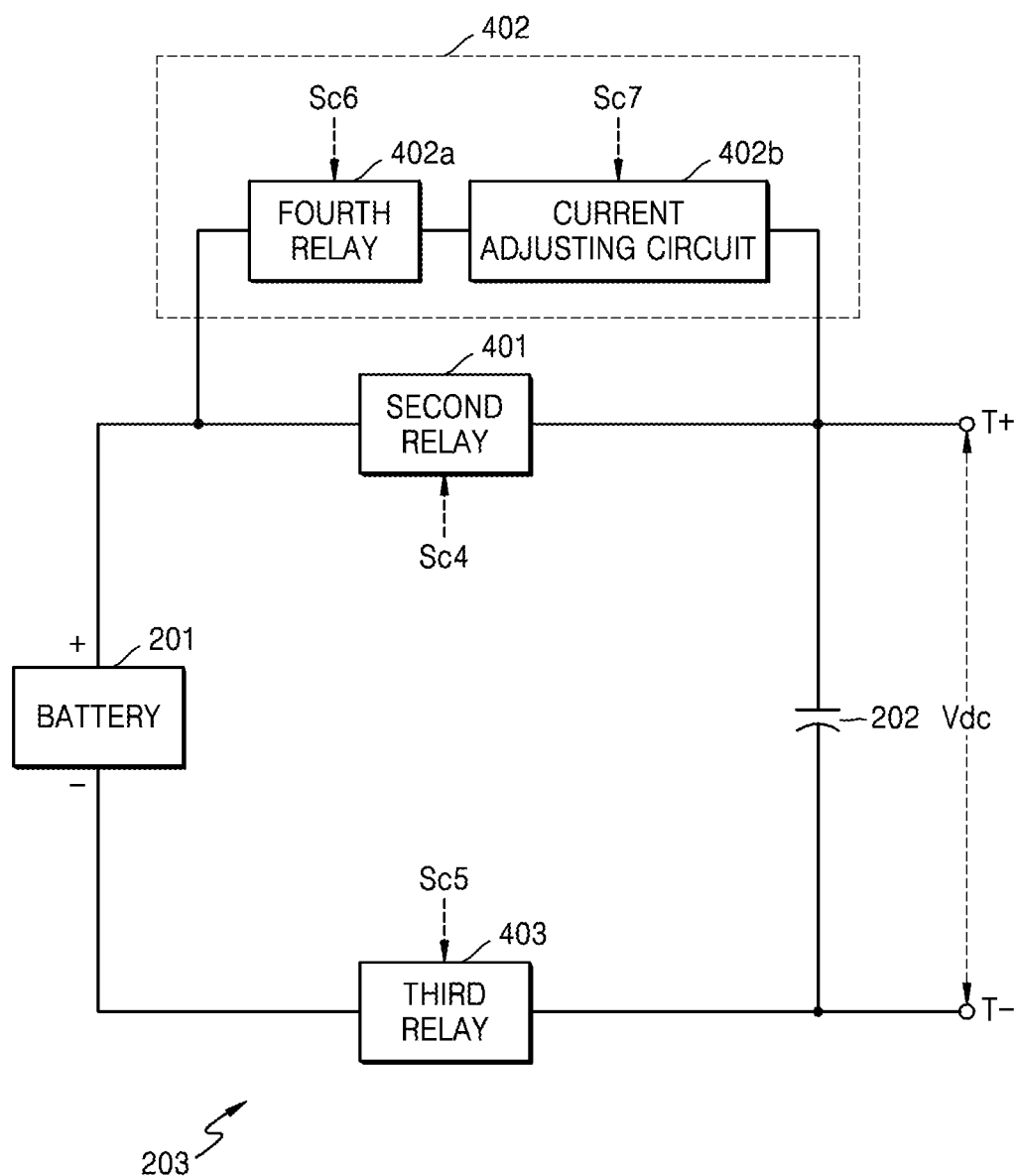
FIG. 4 is a diagram showing an example of a software type charging circuit of FIG. 2.

FIG. 4 shows an example of the software type condenser charging circuit 203 of FIG. 2. In FIG. 4, like reference numerals to those of FIG. 2 denote the same elements. In FIG. 4, a fourth control signal Sc4, a fifth control signal Sc5, a sixth control signal Sc6, and a seventh control signal Sc7 are included in the control signals Sps from the controller 101 (see FIG. 1).

Referring to FIG. 4, the software type condenser charging circuit 203 of FIG. 2 includes a second relay 401, an initial switching circuit 402, and a third relay 403. Complicated driving circuits of each relay are omitted in FIG. 4. That is, it is assumed that each relay includes a driving circuit of its own.

The second relay 401 is connected between the positive (+) terminal of the battery 201 as a DC power source and a positive terminal (T+) of the DC-link condenser 202. The initial switching circuit 402 is connected to opposite ends of the second relay 401 to provide a current path at the initial charging stage. The third relay 403 is connected between a negative terminal (−) of the battery 201 and a negative terminal (T−) of the DC-link condenser 202.

The initial switching circuit 402 included in the software type condenser charging circuit 203 includes a fourth relay 402a and a current adjusting circuit 402b connected to each other in series.

When the software type condenser charging circuit 203 operates to initially charge the DC-link condenser 202, the controller 101 (see FIG. 1) makes the third relay 403 and the fourth relay 402a turned on according to the fifth control signal Sc5 and the sixth control signal Sc6, so that the DC-link condenser 202 is charged via the initial switching circuit 402 for a set period of time, e.g., two seconds. Next, the controller 101 monitors the DC-link condenser 202 by detecting the voltage Vdc between the opposite ends of the DC-link condenser 202, and operates according to monitoring result. When the voltage Vdc between the opposite ends exceeds 90% of the maximum charging voltage, the controller 101 makes the second relay 401 turned on by the fourth control signal Sc4. When the voltage Vdc between the opposite ends of the DC-link condenser 202 does not exceed 90% of the maximum charging voltage during the initial charging time period, that is, two seconds, the controller 101 outputs an alarm signal.

As described above, the software type condenser charging circuit 203 operates according to control of the controller 101 monitoring the voltage Vdc between the opposite ends of the DC-link condenser 202. Accordingly, the accuracy of the initial charging control of the software type condenser charging circuit 203 is less than that of the hardware type condenser charging circuit 204 (see FIG. 2). However, when the electric vehicle operates in an unmanned driving mode, the controller 101 performs remote controlling, and thus, the software type condenser charging circuit 203 is appropriate.

Figure 5:
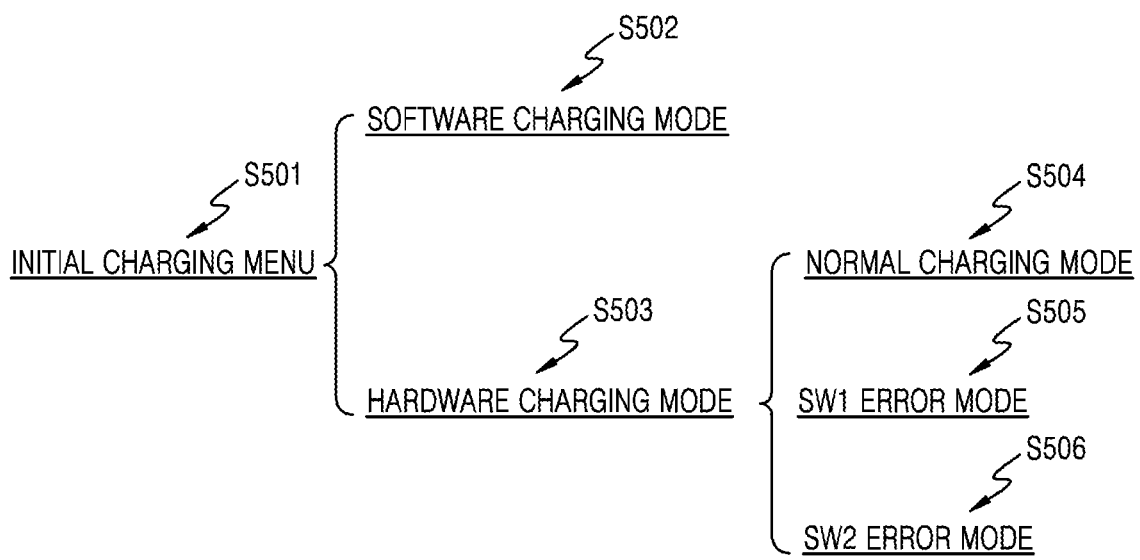
FIG. 5 is a diagram of an initial charging menu provided to a user of the electric vehicle of FIG. 1.

FIG. 5 shows an initial charging menu S501 provided to the user of the electric vehicle of FIG. 1.

Referring to FIG. 5, the initial charging menu S501 provided to the user includes a software charging mode S502 and a hardware charging mode S503.

In the software charging mode S502, the initial charging is performed by the software type condenser charging circuit 203 (see FIG. 2).

The hardware charging mode S503 includes a normal charging mode S504, a first switch SW1 error mode S505, and a second switch SW2 error mode S506.

The first switch SW1 error mode S505 is selected by the user when the first switch SW1 (see FIG. 3) of the hardware type condenser charging circuit 204 (see FIG. 2) breaks. In addition, the first switch SW1 error mode may be also selected by the user if the second relay 401 (see FIG. 4) in the software type condenser charging circuit 203 (see FIG. 2) breaks.

In the first switch SW1 error mode S505, the initial switching circuit 402 (see FIG. 4) in the software type condenser charging circuit 203 operates instead of the initial switching circuit 304 (see FIG. 3) in the hardware type condenser charging circuit 204.

The second switch SW2 error mode S506 is selected by the user in a case where the second switch SW2 (see FIG. 3) in the hardware type condenser charging circuit 204 (see FIG. 2) breaks. In addition, the second switch SW2 error mode may be also selected by the user if the initial switching circuit 402 (see FIG. 4) in the software type condenser charging circuit 203 (see FIG. 2) breaks.

In the second switch SW2 error mode (S506), the controller 101 (see FIG. 1) charges the DC-link condenser 202 during a set period of time by using the initial switching circuit 304 (see FIG. 3) in the hardware type condenser charging circuit 204 and then turns the second relay 401 (see FIG. 4) in the software type condenser charging circuit 203 on.

As described above, if the hardware type condenser charging circuit 204 is partially broken, a part of the software type condenser charging circuit 203 operates instead. In this case, the accuracy in the initial charging control may be improved when comparing with a case in which the software type condenser charging circuit 203 is only used. Also, if the software type condenser charging circuit 203 is partially broken, a part of the hardware type condenser charging circuit 204 operates instead.

Figure 6:
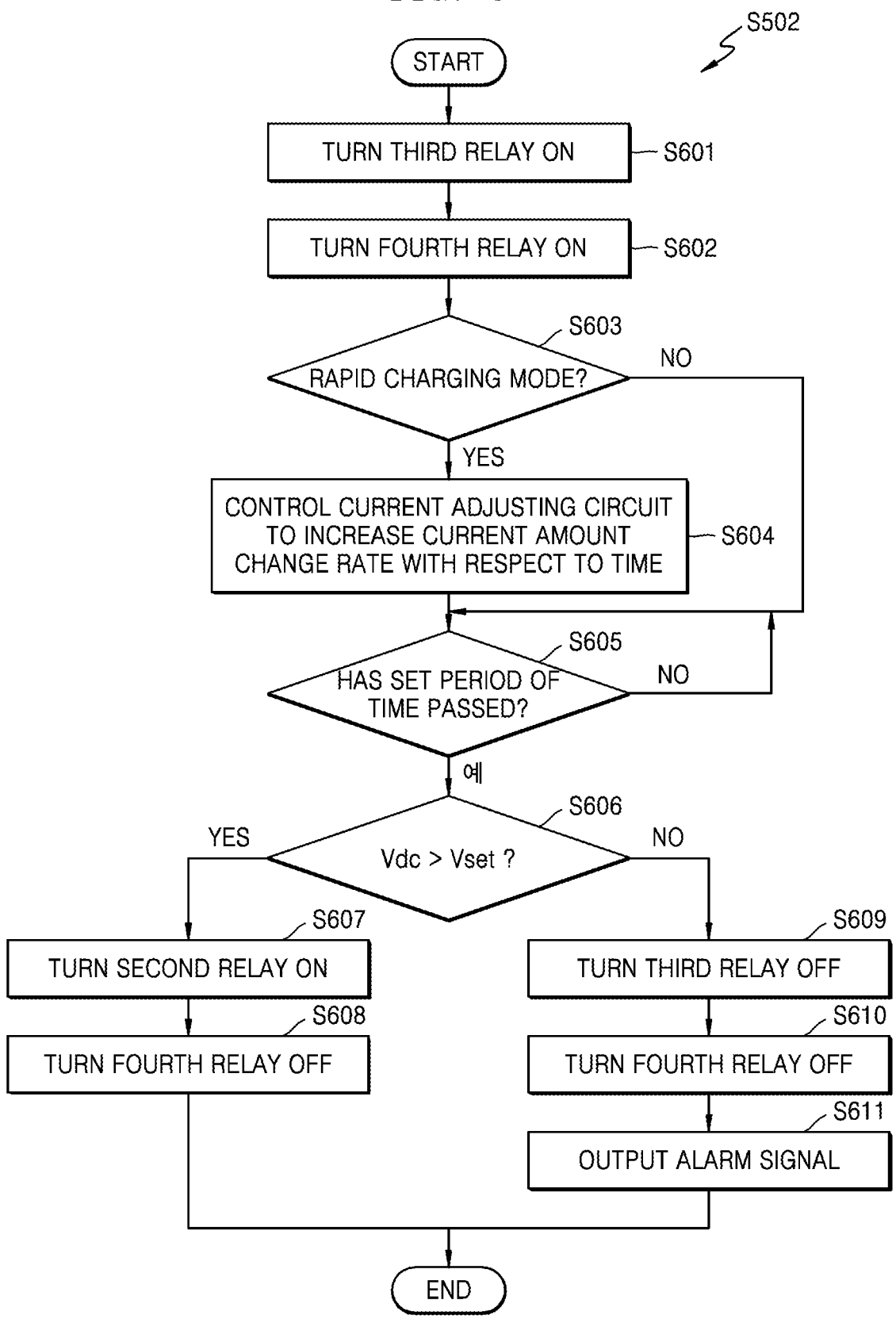
FIG. 6 is a flowchart of a software type charging mode in FIG. 5 performed by a controller of FIG. 1.

FIG. 6 shows a software charging mode S502 in FIG. 5 performed by the controller 101 of FIG. 1. As described above, in the software charging mode S502, the initial charging operation is performed by the software type condenser charging circuit 203 (see FIG. 2). Referring to FIGS. 4 and 6, operations of the controller 101 in the software charging mode S502 will be described below.

To begin with, the controller 101 turns on the third relay 403 according to the fifth control signal Sc5 (operation S601), and turns on the fourth relay 402a according to the sixth control signal Sc6 (operation S602). Accordingly, a relatively small amount of current flows through the initial switching circuit 402 to start the charging of the DC-link condenser 202.

Here, the controller 101 determines whether the user selects a rapid charging mode (operation S603). In a case of the rapid charging mode, the controller 101 controls the current adjusting circuit 402b according to the seventh control signal Sc7 to increase a current amount change rate with respect to time (operation S604).

Next, when a set period of time, for example, two seconds, has passed from a time point when the third relay 403 is turned on (operation S605), the controller 101 determines whether the voltage Vdc between the opposite ends of the DC-link condenser 202 is greater than the set initial voltage Vset (operation S606). In this case, the set initial voltage Vset is 90% of the maximum charging voltage of the DC-link condenser 202.

When the voltage Vdc between the opposite ends of the DC-link condenser 202 is higher than the set initial voltage Vset, the controller 101 turns on the second relay 401 according to the fourth control signal Sc4 (operation S607), and turns off the fourth relay 402a according to the sixth control signal (Sc6) (operation S608).

When the voltage Vdc between the opposite ends of the DC-link condenser 202 is not higher than the set initial voltage Vset, the controller 101 turns off the third relay 403 according to the fifth control signal Sc5 (operation S609) and turns off the fourth relay 402a according to the sixth control signal Sc6 (operation S610), and then, outputs an alarm signal (operation S611).

Figure 7:
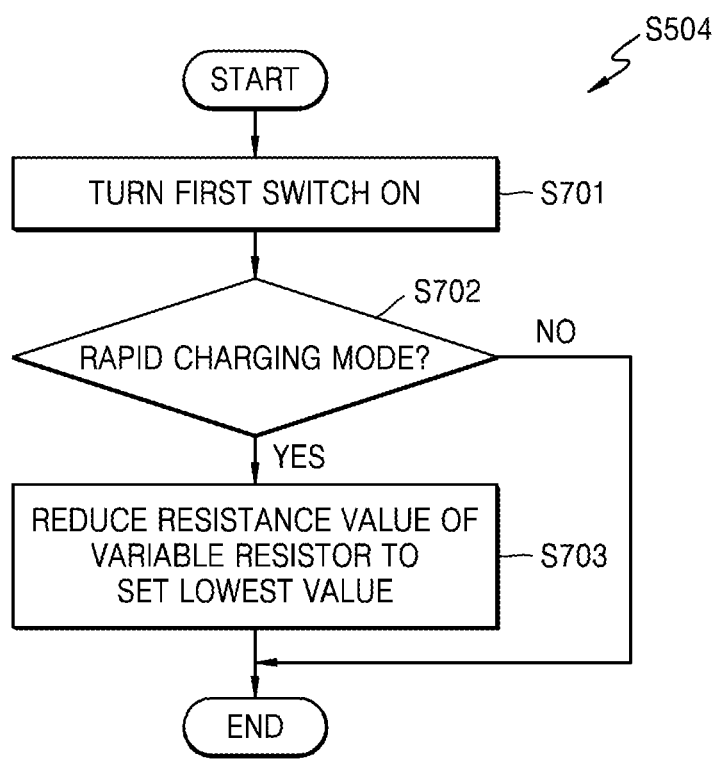
FIG. 7 is a flowchart of a normal charging mode in FIG. 5 performed by a controller of FIG. 1.

FIG. 7 shows a normal charging mode S504 of the hardware charging mode S503 of FIG. 5 performed by the controller 101 of FIG. 1. Operations of the controller 101 in the normal charging mode S504 will be described below with reference to FIGS. 3 and 7.

First, the controller 101 turns on the first switch SW1 according to the first control signal Sc1 (operation S701). Here, the second switch SW2 is designed to be initialized in a turn-on state all the time. Accordingly, a relatively small amount of current flows through the initial switching circuit 304 to perform the initial charging operation.

Next, the controller 101 determines whether the user selects a rapid charging mode (operation S702). In a case of the rapid charging mode, the controller 101 reduces a resistance value of the variable resistor VR according to the second control signal Sc2 (operation S703).

Next, as described above with reference to FIG. 3, the first relay 303 is turned on due to the hardware driving.

Therefore, if there is an error in the software for the initial charging shown in FIG. 6, the controller 101 performs the normal charging mode S504 to perform the initial charging operation.

As described above, the first switch SW1 is turned on or turned off according to the first control signal Sc1 from the controller 101 or by the user manipulation. The variable resistor VR has a resistance value varying depending on a second control signal Sc from the controller 101 or user manipulation. Therefore, if an error occurs in the initial charging operation of the controller 101, the normal charging mode S504 may be performed by the direct switching manipulation of the user.

Figure 8:
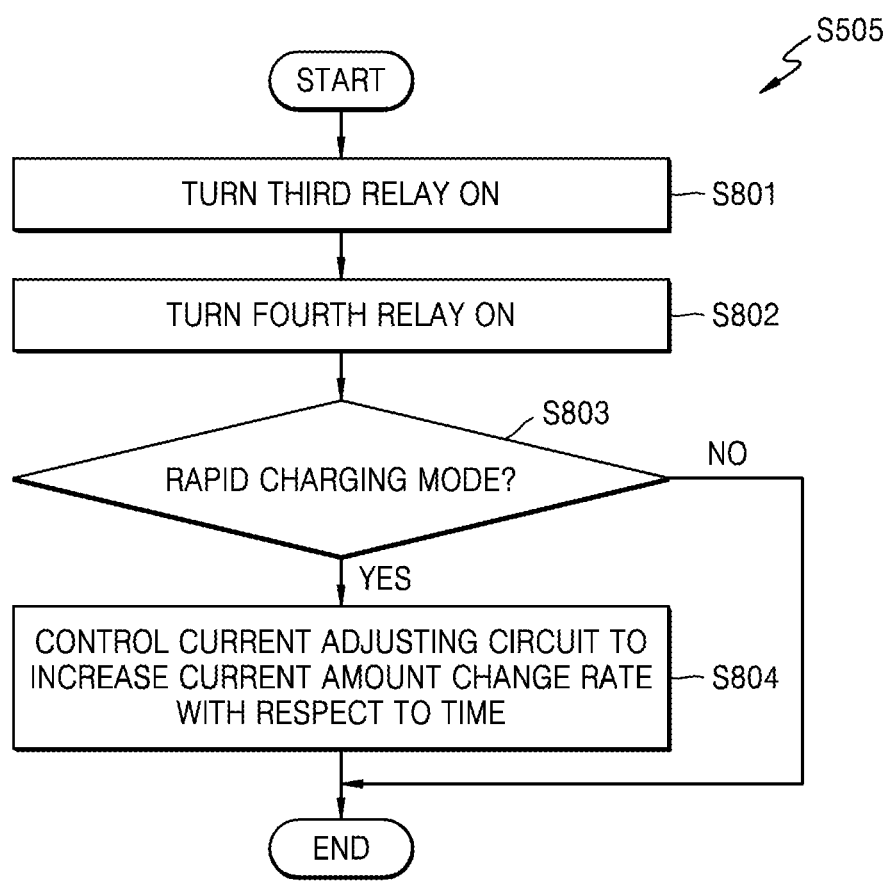
FIG. 8 is a flowchart of a first switch error mode in FIG. 5 performed by the controller of FIG. 1.

FIG. 8 shows the first switch SW1 error mode S505 of FIG. 5 performed by the controller 101 of FIG. 1. As described above, the first switch SW1 error mode S505 is selected by the user if the first switch SW1 (see FIG. 3) of the hardware type condenser charging circuit 204 (see FIG. 2) is broken. In addition, the first switch SW1 error mode may be also selected by the user if the second relay 401 (see FIG. 4) in the software type condenser charging circuit 203 (see FIG. 2) breaks.

Here, the initial switching circuit 402 (see FIG. 4) in the software type condenser charging circuit 203 operates instead of the initial switching circuit 304 (see FIG. 3) in the hardware type condenser charging circuit 204. Therefore, the first switch SW1 error mode S505 of FIG. 8 will be described below with reference to FIGS. 3, 4, and 8.

First, the controller 101 turns on the third relay 403 in the software type condenser charging circuit 203 according to the fifth control signal Sc5 (operation S801), and turns on the fourth relay 402a in the software type condenser charging circuit 203 according to the sixth control signal Sc6 (operation S802). Accordingly, a relatively small amount of current flows through the initial switching circuit 402 to start the charging of the DC-link condenser 202.

Here, the controller 101 determines whether the user selects a rapid charging mode (operation S803). In a case of the rapid charging mode, the controller 101 controls the current adjusting circuit 402b according to the seventh control signal Sc7 to increase a current amount change rate with respect to time (operation S804).

Next, as described above with reference to FIG. 3, the first relay 303 is turned on according to the operation of the hardware type condenser charging circuit 204. Therefore, according to the first switch SW1 error mode S505 of FIG. 8, the accuracy in the initial charging control may be improved when it is compared with that in a case where the software type condenser charging circuit 203 is only used.

Figure 9:
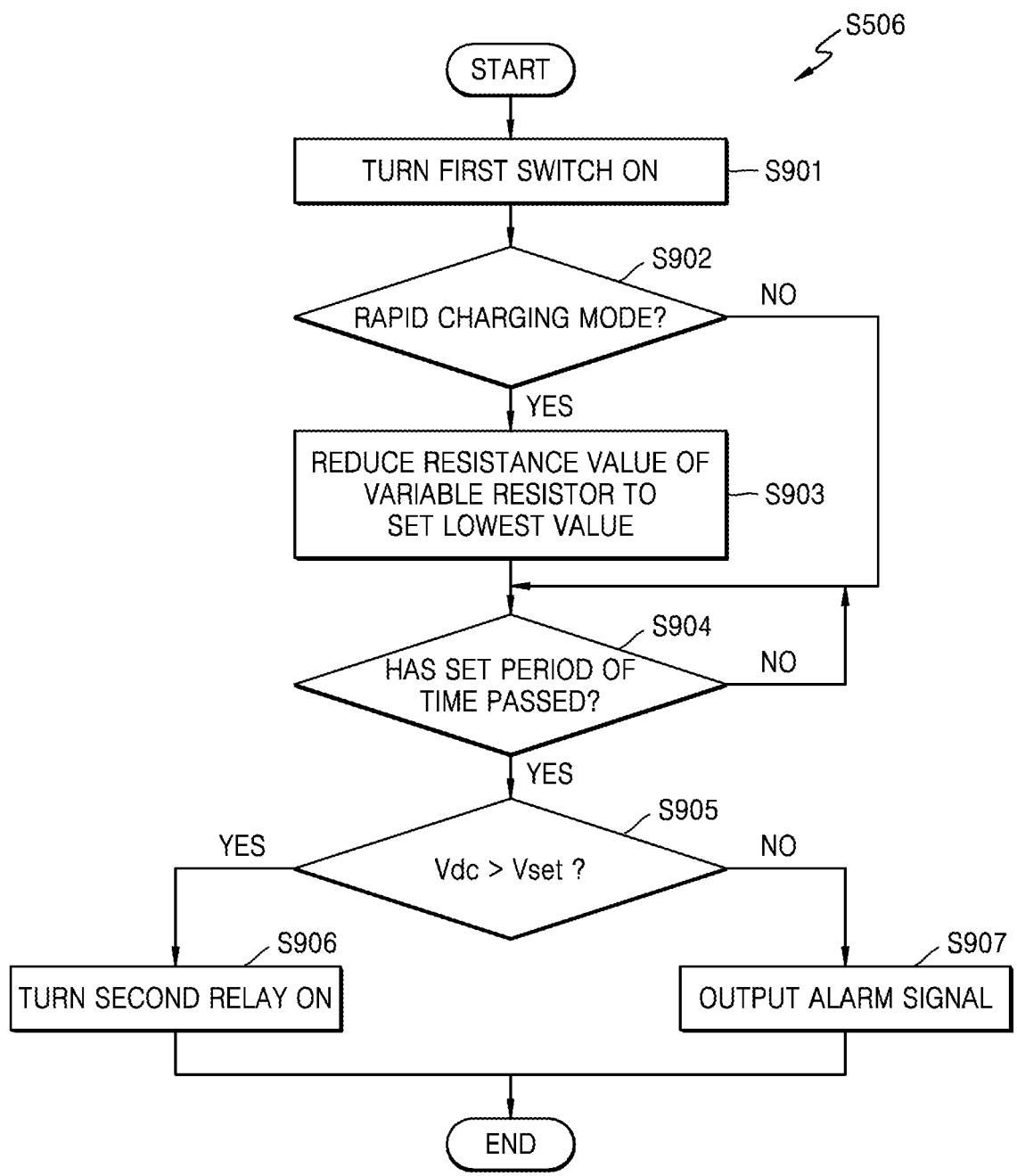
FIG. 9 is a flowchart of a second switch error mode in FIG. 5 performed by the controller of FIG. 1.

FIG. 9 shows the second switch SW2 error mode S506 in FIG. 5 performed by the controller 101 of FIG. 1. As described above, the second switch SW2 error mode S506 is selected by the user if the second switch SW2 (see FIG. 3) of the hardware type condenser charging circuit 204 (see FIG. 2) is broken. In addition, the second switch SW2 error mode may be also selected by the user if the initial switching circuit 402 (see FIG. 4) in the software type condenser charging circuit 203 (see FIG. 2) breaks.

Here, the controller 101 controls that the second relay 401 (see FIG. 4) in the software type condenser charging circuit 203 is turned on after the DC-link condenser 202 is charged by the initial switching circuit 304 (see FIG. 3) in the hardware type condenser charging circuit 204 during the set period of time. Therefore, the second switch SW2 error mode of FIG. 9 will be described below with reference to FIGS. 3, 4, and 9.

First, the controller 101 turns on the first switch SW1 in the hardware type condenser charging circuit 204 according to the first control signal Sc1 (operation S901). Accordingly, relatively small amount of current flows through the initial switching circuit 304 in the hardware type condenser charging circuit 204 to perform the initial charging operation.

Next, the controller 101 determines whether the user selects a rapid charging mode (operation S902). In a case of the rapid charging mode, the controller 101 reduces a resistance value of the variable resistor VR according to the second control signal Sc2 (operation S903).

Next, when a set period of time, for example, two seconds, has passed from a time point when the first switch SW1 is turned on (operation S904), the controller 101 determines whether the voltage Vdc between the opposite ends of the DC-link condenser 202 is greater than the set initial voltage Vset (operation S905). In the present embodiment, the set initial voltage Vset is 90% of the maximum charging voltage of the DC-link condenser 202.

When the voltage Vdc between the opposite ends of the DC-link condenser 202 is higher than the set initial voltage Vset, the controller 101 turns on the second relay 401 in the software type condenser charging circuit 203 according to the fourth control signal Sc4 (operation S906).

When the voltage Vdc between the opposite ends of the DC-link condenser 202 is not higher than the set initial voltage Vset, the controller 101 outputs an alarm signal (S907).

As described above, according to the electric vehicle of the embodiments of the present disclosure, the software type condenser charging circuit and the hardware type condenser charging circuit may be adaptively used. Accordingly, following effects may be obtained.

First, when there is an error in the software at the initial charging, the hardware type condenser charging circuit may be operated by the controller. Also, when there is an error in operations of the controller, the hardware type condenser charging circuit may be operated by direct switching manipulation of the user.

Therefore, even if an error occurs in the operations of the initial charging software and operations of the controller, the DC-link condenser may be normally charged by the hardware type condenser charging circuit. Therefore, problems of not operating the electric vehicle or electric damages in the DC-link condenser and the loads may be prevented.

In particular, if the above problems do not occur in an electric vehicle in a state of manned driving, not unmanned driving, passengers in the electric vehicle may not be hurt. For example, if a soldier is in a battle while driving a military use electric vehicle, the soldier may not be endangered.

Second, the hardware type condenser charging circuit is operated when the controller controls the hardware type condenser charging circuit without monitoring the voltage between the opposite ends of the DC-link condenser or by the direct switching manipulation of the user. Therefore, when the hardware type condenser charging circuit is used, the accuracy of initial charging control may be relatively improved.

Third, when the hardware type condenser charging circuit is partially broken, a part of the software type condenser charging circuit may be operated instead. In this case, the accuracy in the initial charging control may be improved when comparing with a case in which the software type condenser charging circuit is only used. Alternately, when the software type condenser charging circuit is partially broken, a part of the hardware type condenser charging circuit may be operated instead.

In addition, the software type condenser charging circuit and the hardware type condenser charging circuit may be appropriately and efficiently used. For example, when the electric vehicle operates in a manned driving mode, a high accuracy of initial charging operation is necessary, and thus, the hardware type condenser charging circuit is appropriate. In addition, when the electric vehicle operates in an unmanned driving mode, the controller performs remote controlling, and thus, the software type condenser charging circuit is appropriate.

Although a few embodiments of the present invention have been shown and described, it would be appreciated by those skilled in the art that changes may be made in these embodiments without departing from the principles and spirit of the invention, the scope of which is defined in the claims and their equivalents.

INDUSTRIAL APPLICABILITY

The present disclosure may be likely to be used in a capacitor charging system in other devices, as well as in electric vehicles.

The invention claimed is:

1. An electric vehicle driven by at least one vehicle driving motor, the electric vehicle comprising:
a controller and an electric power supplier,
wherein the electric power supplier comprises;
a direct-current (DC) power source;
a DC-link condenser to which electrical loads are connected;
a software type condenser changing circuit connected between the DC power source and the DC-link condenser, and configured to operate when the controller controls the software type condenser charging circuit while monitoring a voltage between opposite ends of the DC-link condenser at an initial charging stage; and
a hardware type condenser charging circuit connected between the DC power source and the DC-link condenser, and configured to operate when the controller controls the hardware type condenser charging circuit without monitoring the voltage between the opposite ends of the DC-link condenser at the initial charging stage, or by a direct switching manipulation of a user,
wherein the hardware type condenser charging circuit comprises:
a first relay connected between a positive terminal of the DC power source and a positive terminal of the DC-link condenser; and
a relay driving circuit configured to turn the first relay on when a voltage of the DC-link condenser is higher than a set initial voltage,
wherein the relay driving circuit comprises a switching transistor, a comparator, and a voltage detection circuit,
the voltage detection circuit is connected to the opposite ends of the DC-link condenser,
when the switching transistor is in a turn-on state, an exciting current path of the first relay is formed,
when the switching transistor is in a turn-off state, the exciting current path of the first relay is blocked, and
when a detection voltage detected by the voltage detection circuit is higher than a set detection voltage, the switching transistor is turned on by the comparator.

2. The electric vehicle of claim 1, wherein the hardware type condenser charging circuit comprises an initial switching circuit connected to opposite ends of the first relay to provide a current path at the initial charging stage,
wherein the initial, switching circuit comprises a first switch and a variable resistor connected to each other in series,
the voltage detection circuit included in the relay driving circuit comprises a first resistor, a second switch, and a second resistor connected to one another in series,
an end of the first resistor is connected to an end of the DC-link condenser,
an end of the second resistor is connected to a ground terminal, and
the second switch is connected between an opposite end of the first resistor and an opposite end of the second resistor.

3. The electric vehicle of claim 2, wherein the second switch is turned on or turned off according to a control signal from the controller or by user manipulation.

4. The electric vehicle of claim 2, wherein the opposite end of the second resistor and a positive input terminal of the comparator are connected to each other,
a Zener diode is connected between a negative input terminal of the comparator and the ground terminal, and
a pulse bypass capacitor is connected between the opposite end of the second resistor and the ground terminal.

5. The electric vehicle of claim 2, wherein the software type condenser charging circuit comprises:
a second relay connected between a positive terminal of the DC power source and a positive terminal of the DC-link condenser;
an initial switching circuit connected to opposite ends of the second relay to provide a current path at the initial, charging stage; and
a third relay connected between a negative terminal of the DC power source and a negative terminal of the DC-link condenser.

6. The electric vehicle of claim 5, wherein, when the software type charging circuit operates for an initial charging operation of the DC-link condenser, the controller turns the third relay on and then turns the second relay on after the DC-link condenser is charged by the initial switching circuit during a set period of time.

7. The electric vehicle of claim 6, wherein the initial switching circuit included in the software type condenser charging circuit comprises a fourth relay and a current adjusting circuit connected to each other in series.

8. The electric vehicle of claim 7, wherein an initial charging menu provided to the user comprises a software charging mode and a hardware charging mode,
    initial charging is performed by the software type condenser charging circuit in the software charging mode,
    the hardware charging mode comprises a normal charging mode, a first switch error mode, and a second switch error mode,
    the first switch error mode is selected by the user when the first switch in the hardware type condenser charging circuit is broken, and
    the second switch error mode is selected by the user when the second switch in the hardware type condenser charging circuit is broken.

9. The electric vehicle of claim 8, wherein, in the first switch error mode, the initial switching circuit in the software type condenser charging circuit operates instead of the initial switching circuit in the hardware type capacitor charging circuit.

10. The electric vehicle of claim 8, wherein, in the second switch error mode, the controller turns on the second relay in the software type condenser charging circuit after the DC-link condenser is charged by the initial switching circuit in the hardware type condenser charging circuit during a set period of time.

* * * * *